Jan. 7, 1936.  W. B. WHITSITT  2,027,259
AIR DISTRIBUTING MEANS FOR PASSENGER CARS
Filed Feb. 11, 1932  5 Sheets-Sheet 2
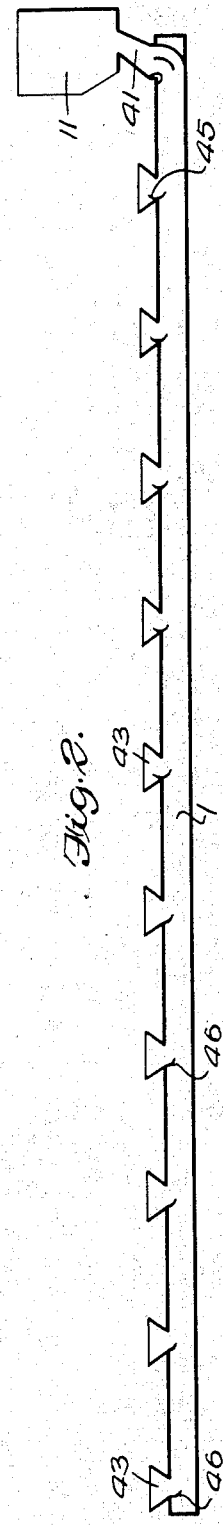
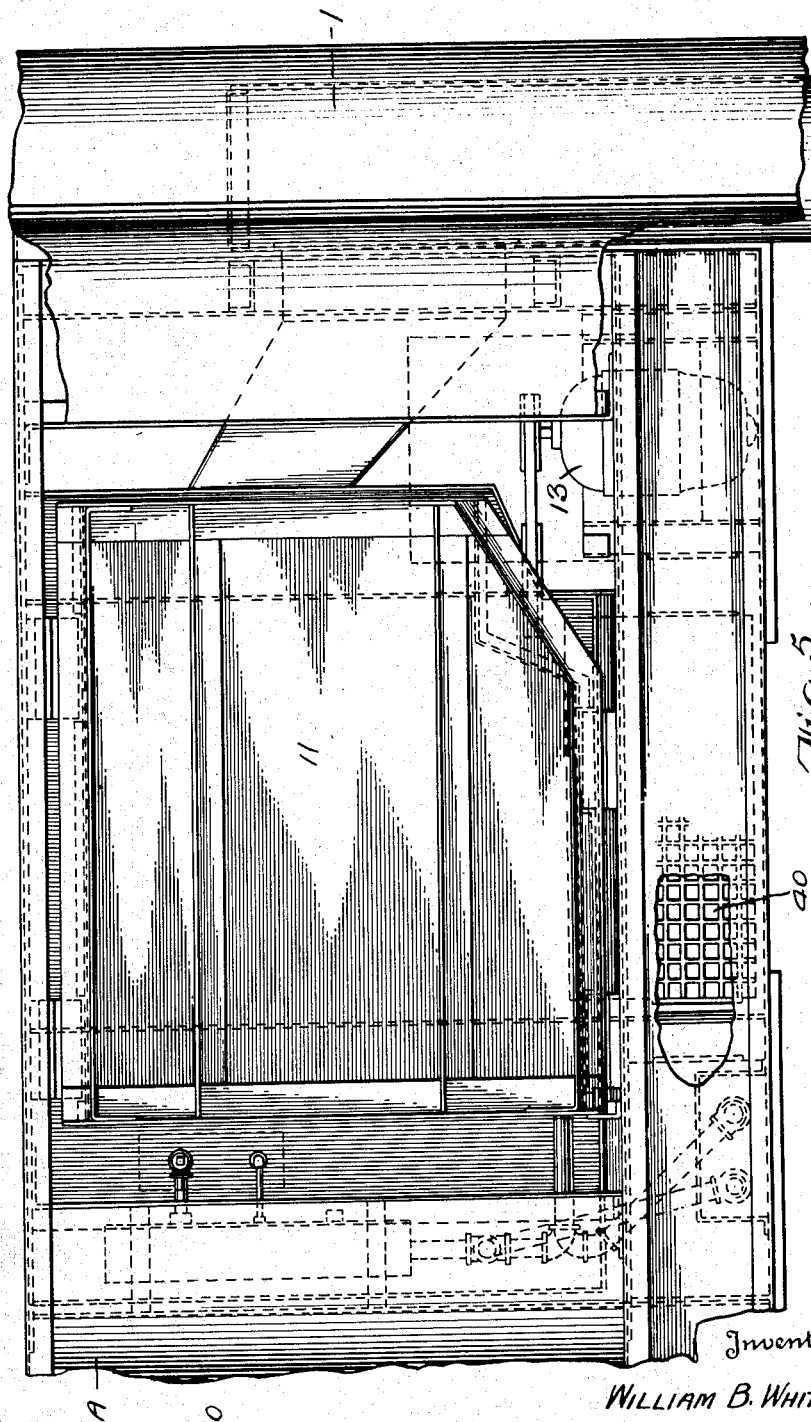
Inventor
WILLIAM B. WHITSITT.
By
Attorney

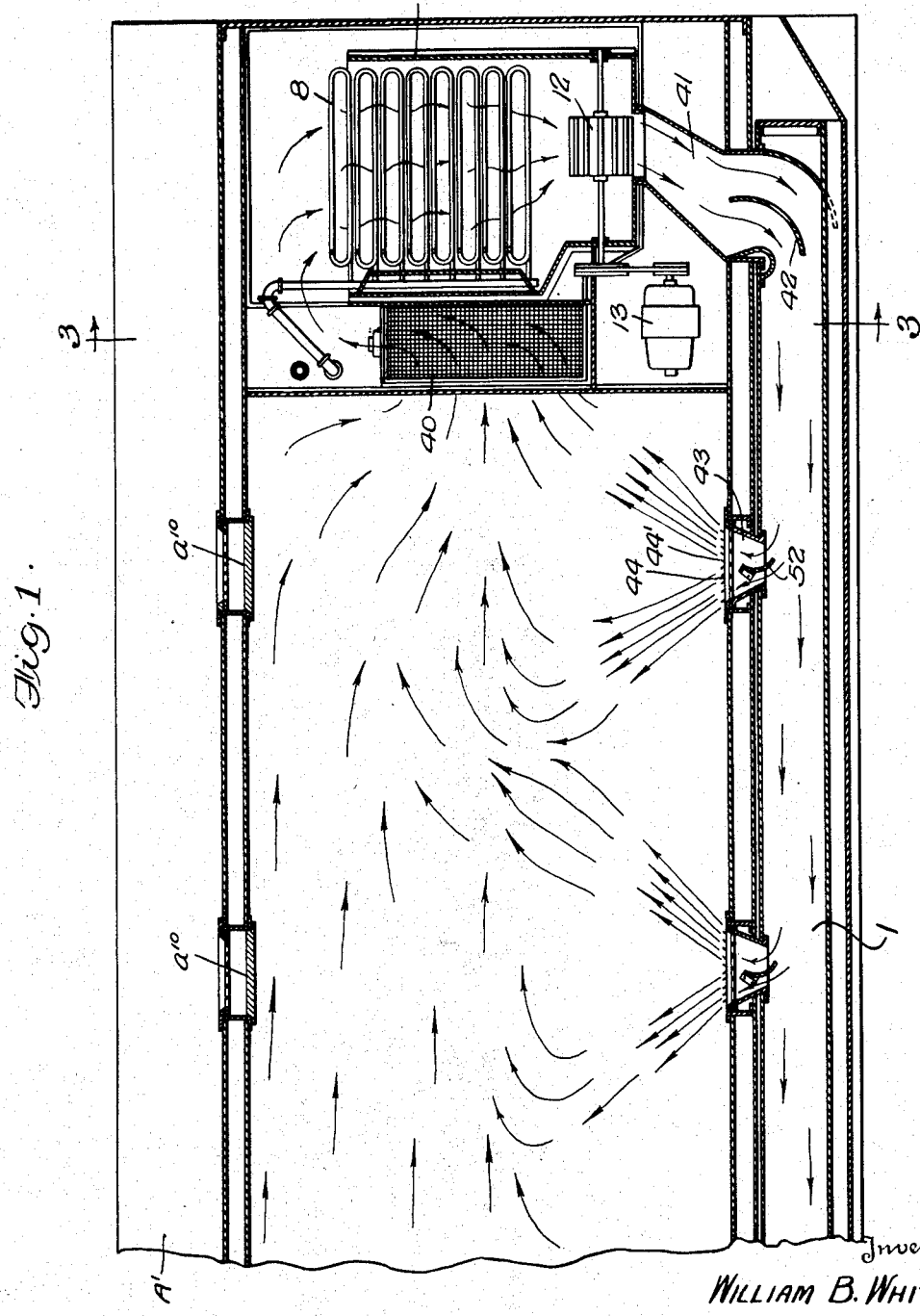

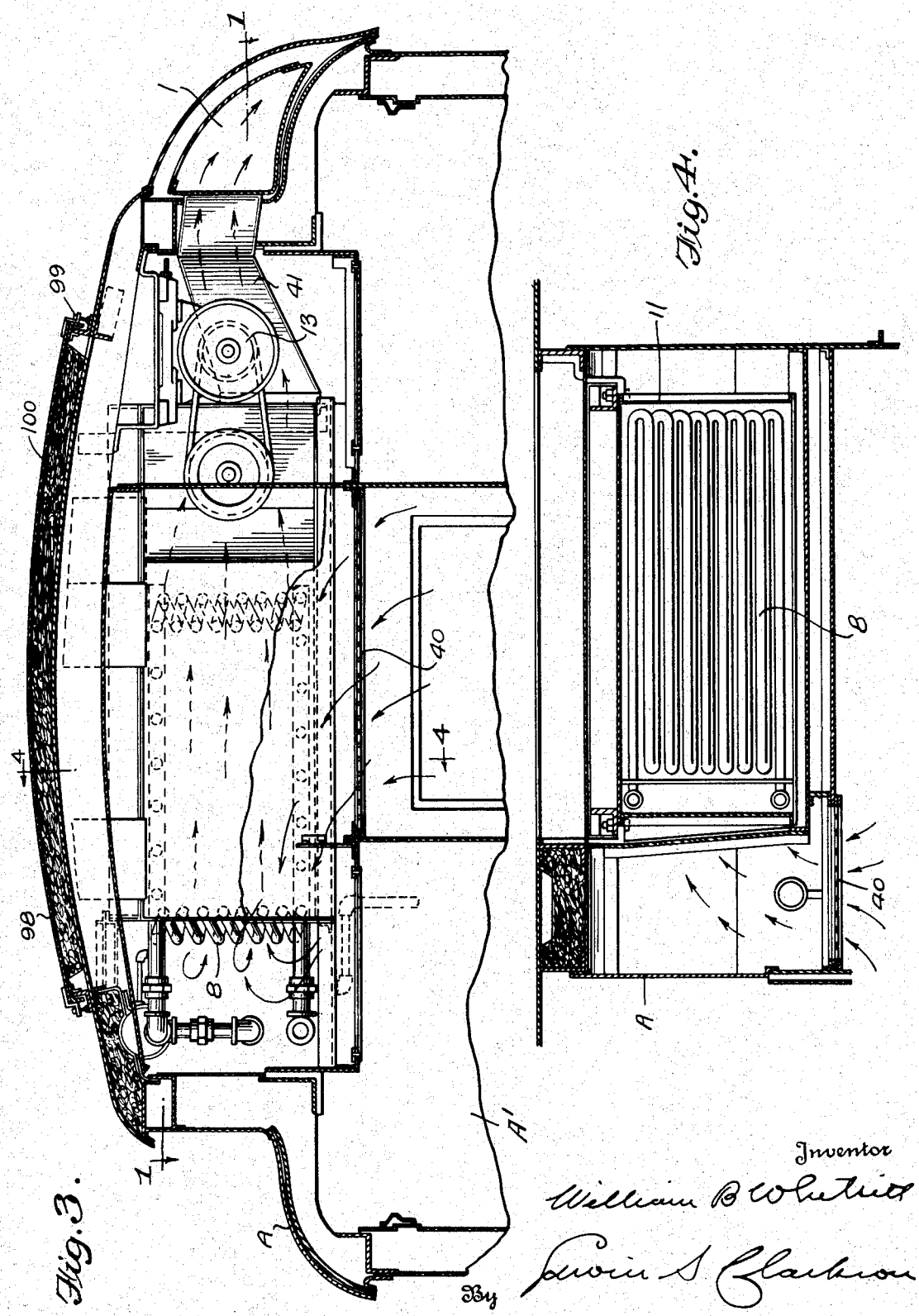

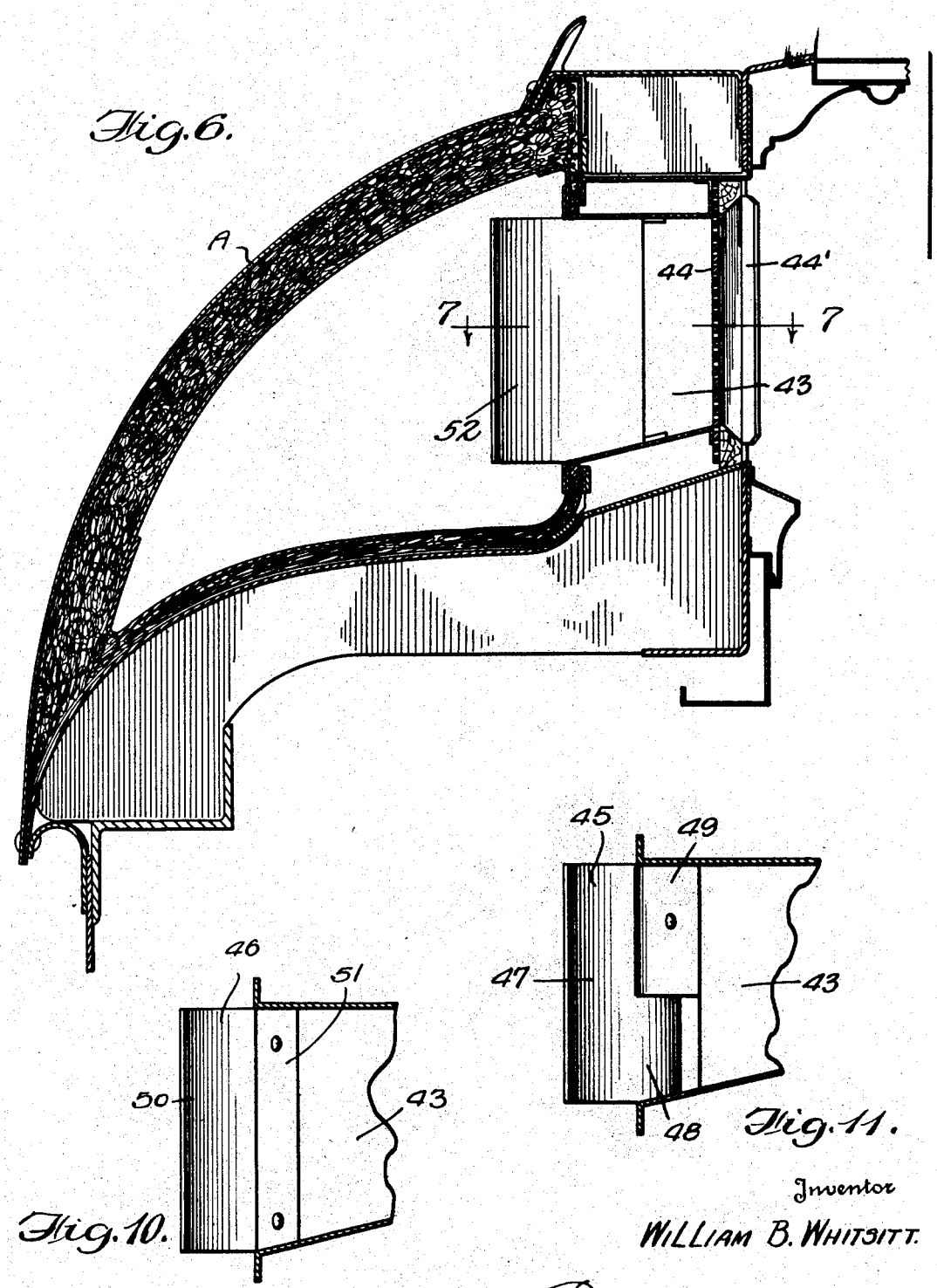

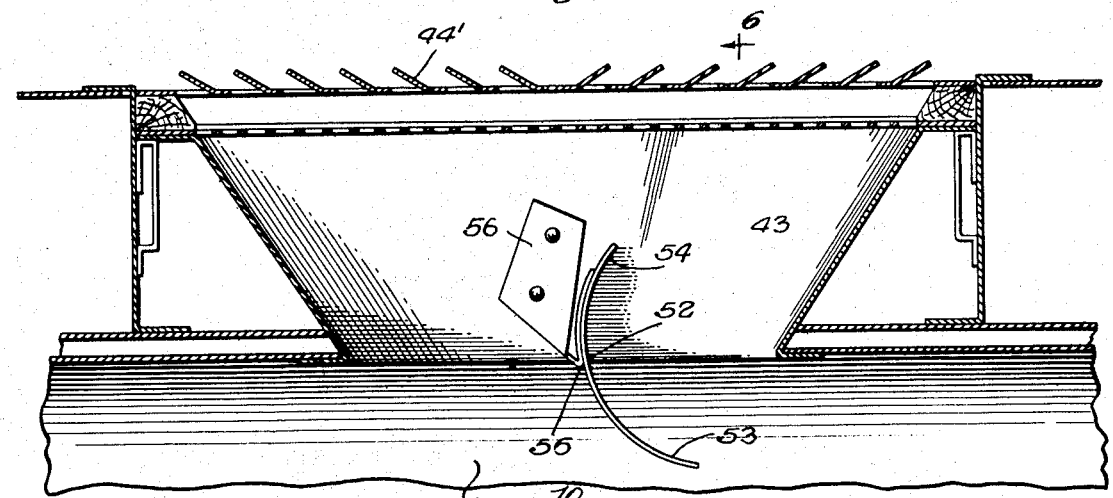
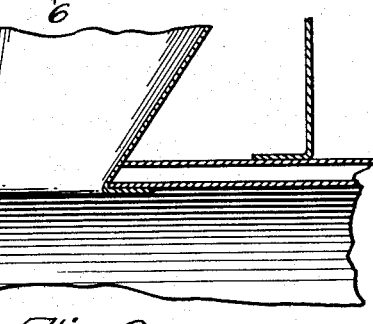
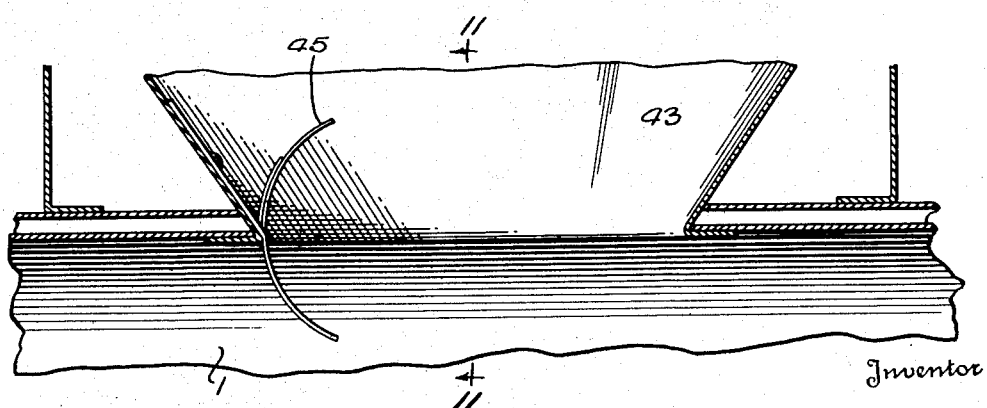

Patented Jan. 7, 1936

2,027,259

UNITED STATES PATENT OFFICE 2,027,259

AIR DISTRIBUTING MEANS FOR PASSENGER CARS

William B. Whitsitt, Baltimore, Md.

Original application May 4, 1931, Serial No. 534,995. Divided and this application February 11, 1932, Serial No. 592,414

3 Claims. (Cl. 98—4)

This application is a division of my prior application Serial No. 534,995, filed May 4, 1931, which has eventuated in Patent No. 1,882,537, dated October 11, 1932, for Air conditioning apparatus for passenger cars.

This invention relates to air distributing means for use in connection with air conditioning apparatus for railway passenger cars, and one object of the invention is to provide a simple, reliable and efficient means for circulating the air while eliminating all objectionable drafts.

Another object of the invention is to provide an air distributing means which can be installed on existing cars at a low cost and without marring the interior finish of the car, and which can be applied to new cars when building at a cost very little, if any, in excess of what the same car would cost equipped with ordinary bulkhead and ceiling fans.

Still another object of the invention is to provide air distributing means of such simple, reliable and efficient design that its operation and maintenance can be easily taken care of without requiring the services of specially trained men.

Still another object of the invention is to provide an arrangement for distributing conditioned air at intervals throughout the length of the passenger compartment of a car at one side of the car only, whereby ordinary upper deck ventilators at the opposite side of the car may be used for ventilating purposes in the ordinary manner in case the air conditioning apparatus of the car should, from any cause, become inoperative.

Still another object of the invention is to provide distributing means whereby conditioned air may be properly supplied uniformly, and without annoying drafts, throughout the length of the passenger compartments of cars having passenger compartments of different lengths, whereby the apparatus is rendered available for use on coaches, diners, combination cars, sleepers, and other cars of a train having passenger compartments varying in size, and whereby the automatic air conditioning of all the cars of a solid train is rendered possible.

With the above and other objects in view, the invention consists of the features of construction, combination and arrangement of parts, hereinafter fully described and claimed, reference being had to the accompanying drawings, in which:—

Fig. 1 is a horizontal transverse section through the portion of a car containing the air conditioning unit, taken substantially on line 1—1 of Fig. 3.

Fig. 2 is a longitudinal section through a portion of a car and showing a distributing duct.

Fig. 3 is a vertical transverse section taken substantially on line 3—3 of Fig. 1.

Fig. 4 is a vertical longitudinal section through the air conditioning unit taken on the line 4—4 of Fig. 3.

Fig. 5 is a plan view looking from above toward the car roof and the parts shown in Figs. 1, 3 and 4, with the trap door removed.

Fig. 6 is an enlarged vertical transverse section through the air duct on the line of one of the air outlets and associated baffles or deflectors taken, for example, on the line 6—6 of Fig. 7.

Fig. 7 is a horizontal section taken on line 7—7 of Fig. 6.

Figs. 8 and 9 are views similar to Fig. 7 showing different arrangements of baffles or deflectors for use at different points in the length of a car having a long passenger compartment.

Figs. 10 and 11 are sections corresponding to Fig. 7 taken on lines 10—10 and 11—11 of Figs. 9 and 8, respectively.

While the apparatus employed will be in general the same regardless of the type of car to which it is applied, two different arrangements are preferably employed, one for use in coaches, diners or other single-type cars in which, because of lack of space or for greater convenience, the air conditioning unit is disposed over the ceiling in the upper deck at one end of the car and a cooling tower for cooling the refrigerant condensing water is placed in the vestibule of the car, and the other for use in combination coach and baggage or other combination-type cars in which, because of space afforded or for greater convenience, the air conditioning unit and cooling tower are placed in the baggage compartment of the car. Variations are also employed in the arrangement of baffles or deflectors associated with the outlets of the distributing ducts of cars having passenger compartments of different lengths in order to prevent drafts and to secure a uniform distribution of the air within the car.

In the drawings I have shown the application of the invention to a passenger car A having a passenger compartment A' preferably provided with the double-sashed windows (not shown) which are designed to remain continuously closed while the air conditioning apparatus and the air distributing means are in operation. The car is also preferably provided at one side only with a longitudinally extending air distributing duct I, the ordinary manually controlled upper deck ventilators $a^{10}$ being employed at the other side of the passenger compartment of the car and also, if desired, at one or both sides of other compartments of the car for ventilation purposes. The object of providing the double-sashed windows and keeping the same closed while the air conditioning apparatus is in operation is, of course, to prevent entrance of dust, soot, cinders and other foreign matter and to isolate the conditioned air from contamination by the external air. By locating the distributing duct 1 at one side only of the passenger compartment and employing the usual upper deck ventilators at the other side of the passenger compartment, an efficient distribution of the conditioned air, by reason of the structural features hereinafter described, may be obtained, while the usual manually controlled ventilators are left available for use in case the air conditioning apparatus of the car should at any time become inoperative.

The air conditioning apparatus in connection with which my improved air distributing means is or may be used includes an air cooling unit for cooling and dehydrating the air comprising cooling coils 8 cooled by suitable refrigerating means and arranged in a cooling chamber or compartment 11 in the car, one or more fans 12 for drawing the air upwardly from the passenger compartment into the chamber 11 at one side and forcing the air through the coils 8 in said chamber 11 at one side and forcing the air through the coils 8 in said chamber and out from the chamber at the opposite side into the distributing duct 1, and an electric motor 13 for driving said fan or fans.

The chamber 11 of the air conditioning unit is in communication through a grille 40 in the car ceiling of the passenger compartment of the car, and air drawn upwardly through this grille by the action of the fan or fans 12 passes into one side of the chamber 11 and flows between the elements of the coil 8 to the opposite side of the chamber 11 and is discharged at the latter-named side of the chamber by the action of the fan or fans 12 into a supply flue or conduit 41 from which it is delivered into the adjacent inlet end of the distributing conduit 1. This inlet end of the conduit is provided with curved baffles or guide plates 42, Fig. 1, to effect an easy entrance of the air into the conduit 1 in line streams and without the production of eddy currents.

The conduit 1 extends the full length of the passenger compartment of the car at one side thereof and is separated from said compartment by spaced insulated walls provided at regular intervals with air discharge outlets or nozzles 43 extending between said spaced walls and each nozzle having its outer or intake side communicating with the conduit and its inner or discharge side communicating with the compartment, said nozzles being preferably of flaring form. Each of these nozzles or outlets is provided at its inner or discharge side with a screen 44 to divide the air into streams and to prevent eddy currents, as well as to retard and reduce the velocity of the air at its point of entrance. Each outlet 43 is also provided on the inside of the screen 44 with a plurality of louvres or shutters 44' arranged in fan formation or inclining from the center of the outlet toward opposite ends of the car so as to cause a desirable diffusion of the entering currents of air. It is also necessary in practice to provide means for arresting the flow of the air, which enters the conduit 1 at considerable velocity from the conduit 41, and to prevent it from traveling too rapidly and banking at the far end of the distributing conduit, as well as to effect an equal distribution of the air to all the discharge nozzles throughout the length of the distributing conduit. Where the passenger compartment of the car, as in a coach or similar car, is lengthy, baffle plates or deflectors 45 and 46 of the types shown in Fig. 2 and in Figs. 9, 11, and 8, 10, respectively, may be employed. As shown in Fig. 2 the conduit 1 is illustrated as provided with ten outlet nozzles 43, and the first five nozzles of the series between the supply nozzle 41 and the center of the passenger compartments are provided with the baffles 45, while the five nozzles more remote from the supply nozzle 41 are provided with the baffles 46. Each baffle 45, as shown, comprises a transversely curved or trough-shaped plate disposed with the center of its concave face bearing centrally against the far side of the outlet 43 and having its portion projecting into the conduit 1 forming a full-length baffle wing 47 and its portion extending into the outlet 43 divided to form a lower half-length baffle wing or lower deflecting portion 48 and an upper attaching flange 49 whereby it is fastened to the wall of the conduit. Each baffle 46 on the other hand is provided with a full-length baffle wing 50 projecting into conduit 1 and is devoid of the half baffle wing 48 provided at the inner side of each baffle 45, being provided at its inner side simply with a full-length attaching flange 51 whereby it is secured in position. With this arrangement of the two sets of baffles 45 and 46, it will be seen that the baffles 45 each present a larger area of air checking surface than the baffles 46, and consequently the velocity of the air will be checked to a greater extent by the baffles 45 than by the baffles 46 and thus that half of the compartment nearest the source of air supply will be prevented from getting more than its due amount of air, while the half of the compartment more remote from the source of supply will be ensured its proper supply of air, the air flow to the outlets being so differentially proportioned by the action of these sets of baffle plates that all portions of the car are supplied alike with the same quantity of air and at substantially the same velocity. The air entering through the nozzles is further checked by the action of the baffles and screens and so guided by the louvres that a uniform distribution of the air throughout the passenger compartment is obtained without any drafts whatever being felt by the occupants of the car. The use of the screens 44 in conjunction with the baffle plates ensures an effective balancing of the pressure of the air streams delivered through the series of nozzles throughout the length of the duct, it being understood that as the velocity of the air entering the nozzles progressively decreases, its pressure proportionately increases so that without the use of the screens jets of varying pressures and some in the nature of pulsating jets would be delivered into the car. By, however, employing screens 44 of suitable mesh a retarding action at the discharge side of each nozzzle is obtained, whereby a balancing of the pressures of the discharging streams at the outlet sides of the nozzles is effected to secure the discharge of substantially the same amount of air at substantially the same pressure from each nozzle.

The construction and arrangement of the baffles 45 and 46 above described while suitable and desirable for use in a coach or similar car with a long passenger compartment, is not so suitable for use on dining and combination cars having short passenger compartments, where the number of discharge nozzles is limited and a special construction and arrangement of the baffles must be employed in order to secure an even distribution of the air from the conduit 1 to the nozzles. In a dining car for example there may be only five discharge nozzles 43 and, owing to the high velocity of the air, baffle plates 52 of the construction and arrangement shown in Figs. 1, 6 and 7 are preferably employed. Each of these baffle plates consists of a trough-shaped plate member having full-length inner and outer wings 53 and 54 projecting respectively into the duct 1 and nozzle 43, the wing 54 being provided on its convex side with a bracket piece 55 with angularly bent end portions 56 adapted to be fastened to the bottom and top walls of the nozzle. The baffles 52 each present a large extent of surface for checking the velocity of the air current, and the degree of the checking and deflecting action of each baffle is dependent upon its position between the end walls of the nozzle. The first baffle 52 of the series, as shown in Figs. 1 and 7, is arranged approximately at the center of the nozzle opening, while the next nozzle of the series, as shown in Fig. 1, is placed a little further from the center of the nozzle and closer to the rear wall of the nozzle, considered in the direction of flow of the air, and the nozzles of the series thus, beginning with the first nozzle, lie at the vertical center of the opening and successively recede therefrom toward the rear wall of the nozzle. The first baffle therefore acts as a partition dividing the nozzle into two passages of substantially equal size for the flow of the air, and the succeeding baffles likewise divide their nozzles into two passages, but of varying widths, the front passages of the nozzles of the series being successively of increased size with respect to the rear passages of the respective nozzles, which are successively of decreased size with respect to each other. Thus the forward nozzles while acting on air of greater velocity than the remaining nozzles will cooperate with the retarding screens to allow no greater amount of air to pass in the same given period of time and a differential distributing action is established to distribute the air in proper proportion to all the nozzles. By this means and by employing screens and louvres of the constructions previously described an equal amount of air may be supplied to all portions of a short passenger compartment without drafts or causing other annoying or disagreeable objections.

By reference to Fig. 3 it will be noted that the air drum 30 is located directly within the inlet end of the air cooling chamber in which the cooling coil 8 is located, and that an opening is provided in the car roof above the air cooling chamber to permit ready and convenient access thereto for introduction and removal of parts therein and their cleaning and repair whenever occasion requires. This opening must be closed absolutely air-tight to prevent external air being mixed with the air being cooled. For this purpose a tight-fitting metal covered door or hatch 98 is provided. This cover seals the opening in an air-tight manner, is detachably secured in position by swing bolts or other suitable fastenings 99, and is provided with an insulation filler of cork or other suitable insulating material 100 to prevent heat radiation.

It will thus be understood that in the operation of the apparatus, air, taken from the passenger compartment of the car, will be drawn by means of the air circulating fans into the air cooling compartment or unit, there cooled by contact with the air cooling coils, and then forced from said cooling compartment or unit into a distributing duct, from which the air is distributed at intervals to different portions of the car along its length, the baffles, screens and louvres associated with the air discharge nozzles or outlets operating differentially on the flowing column of air in the duct to properly apportion the air to the different nozzles so as to effect the supply of a uniform amount of conditioned air to the passenger compartment at all portions thereof without causing objectionable drafts or other annoyances or disturbances. When the apparatus is in operation the cooling action will be such that, no matter how high the normal external atmospheric temperature is, the temperature of the air within the car will be maintained at a desired degree, between 60° and 80°, and this air will be of a proper degree of humidity and free from dust, dirt, cinders and other foreign materials. Should the temperature of the air in the car fall too low, or below a predetermined low degree, the operation of the cooling mechanism will be stopped and the air will simply circulate for a ventilating action until the temperature again rises to a predetermined degree, when the cooling mechanism will be again thrown into operation, so that a substantially uniform degree of temperature of the air within the passenger compartment will be maintained at all times. In the rarely possible event that the apparatus should, from any cause, be made inoperative, the arrangement of the distributing duct at one side only of the passenger compartment of the car, and the provision of the ordinary ventilators at the opposite sides of the car, will allow of the use of the latter for ventilating purposes until operation of the air conditioning mechanism may be resumed.

While the structure disclosed is preferred, it will, of course, be understood that changes in the form, proportions, details of construction and arrangement of parts, to suit different circumstances or conditions in practical use, may be made within the scope of the appended claims without departing from the spirit or sacrificing any of the advantages of the invention.

Having thus described my invention, I claim:—

1. In an air distributing apparatus for railway cars, a distributing conduit extending longitudinally of the car and having at one end an inlet for supply of air under pressure thereto and having a series of longitudinally spaced lateral discharge nozzles, and arcuately curved baffle plates extending transversely of the conduit, and disposed one within each nozzle, for controlling the passage of air from the conduit to the nozzles throughout the series, the baffles of at least some of said nozzles being arranged at different points in their nozzles with respect to the axial centers of their nozzles to separate the associated nozzles into air passages of different effective widths in different nozzles.

2. In an air distributing apparatus for railway cars, a distributing conduit extending longitudinally of the car having an inlet at one end for supply of air under pressure thereto and having a series of lateral discharge nozzles arranged at intervals in its length, and arcuately curved baffle plates extending transversely of the conduit and disposed one within each nozzle, for controlling the flow of air in the conduit and its discharge through the nozzles, said plates of the series from end to end of the conduit being arranged at different points within their nozzles with respect to the axial centers of the nozzles to separate the nozzles into air passages of different effective widths in different nozzles.

3. In an air distributing apparatus for railway cars, a distributing conduit extending longitudinally of the car and having an air inlet at one end and provided with a longitudinal series of lateral discharge nozzles, a retarding and pressure regulating screen covering the outer side of each nozzle, arcuately curved baffle plates disposed transversely in the conduit, one at each point of intersection of a nozzle therewith and extending into said nozzle, the respective baffle plates being disposed at different distances between the front and rear walls of the respective nozzles and differentially dividing the nozzles into passages of different widths to uniformly regulate the flow of the air through the nozzles from end to end of the conduit, and a set of louvres at the outlet end of each nozzle for directly discharging the air into sets of streams flowing longitudinally in opposite directions.

WILLIAM B. WHITSITT.